Nov. 27, 1962  R. C. WEST  3,065,609
ABSORPTION REFRIGERATION SYSTEM
Filed June 1, 1960  3 Sheets-Sheet 1

INVENTOR.
Reginald C. West,
BY Parker & Carter
Attorneys.

Nov. 27, 1962    R. C. WEST    3,065,609
ABSORPTION REFRIGERATION SYSTEM
Filed June 1, 1960    3 Sheets-Sheet 3

INVENTOR.
Reginald C. West,
BY Parker & Carter
Attorneys.

3,065,609
ABSORPTION REFRIGERATION SYSTEM
Reginald C. West, Marshall, Mich., assignor to Sherer-Gillett Company, Marshall, Mich., a corporation of Illinois
Filed June 1, 1960, Ser. No. 33,138
16 Claims. (Cl. 62—85)

This invention relates to refrigeration and particularly to a unique absorption refrigeration system.

Absorption refrigeration systems have been known and commercially used for many years. One of the earliest disclosures of such a system is in the Von Platen et al. Patent No. 1,678,277 which illustrates many of the basic principles involved.

The absorption refrigeration system has several advantages over other types of commercial refrigeration. These systems are quiet and cause no vibration since there are no moving parts. They are considerably cleaner than most mechanical refrigeration systems because mechanical pumps or compressors and other moving parts are eliminated. Because of the simplicity of the system, maintenance problems are quite reduced as contrasted to other conventional systems.

In one well known absorption system, ammonia and water are utilized as a refrigerant, or cooling agent, and an absorption liquid, respectively. A strong solution of ammonia and water is pumped to a generator where the ammonia dissolved in the water is driven off to a condenser. The ammonia vapor is condensed in the condenser and passed into an evaporator or refrigerating coil. In the evaporator coil the ammonia absorbs heat from the surroundings and vaporizes. By the time it leaves the evaporator it may be entirely vaporized. The ammonia vapor then passes into an absorber where it comes into contact with water. As is well known, water has the ability to absorb many times its own volume of ammonia vapor, the degree of absorption depending mainly upon the pressure in the system and the temperature of the water. The lower the water temperature and system pressure, the greater will be the ammonia absorbing ability of the water. A strong liquor of ammonia and water is formed in the absorber and then returned to the generator to begin another cycle through the system. An auxiliary agent, such as hydrogen, which is insoluble or only slightly soluble in water and substantially inert to the cooling agent is used to equalize the pressure in the system.

Although absorption refrigeration systems have many advantages over other refrigeration systems, they likewise have certain disadvantages which have prevented their widespread acceptance. One drawback is the relative weight of the system. As is well known, aqueous ammonia is corrosive to aluminum, and consequently present systems have been made of ferrous materials which are relatively resistant to the corrosive effect of the ammonia solution. The use of ferrous metals results in a rather heavy structure, which increases manufacturing and transportation costs and reduces use of the absorption system for portable refrigerators.

Accordingly a primary object of this invention is to provide an absorption refrigeration system which is extremely light weight.

Another object is to provide a portable absorption refrigerator sufficiently light to be handled by women and children.

Yet another object is to provide a small portable light weight absorption refrigerator composed of aluminum throughout which has an ammonia refrigerant that does not attack the aluminum.

Yet another object is to provide a refrigerant composed of ammonia, water and a small quantity of glycerine which will not attack the aluminum components of an absorption refrigeration system.

Other objects and advantages of the invention will become apparent upon a reading of the following description of the invention.

The invention is illustrated more or less diagrammatically in the accompanying drawings, wherein.

Like reference numerals will be used to refer to like parts throughout the following description of the drawings.

Figure 1:
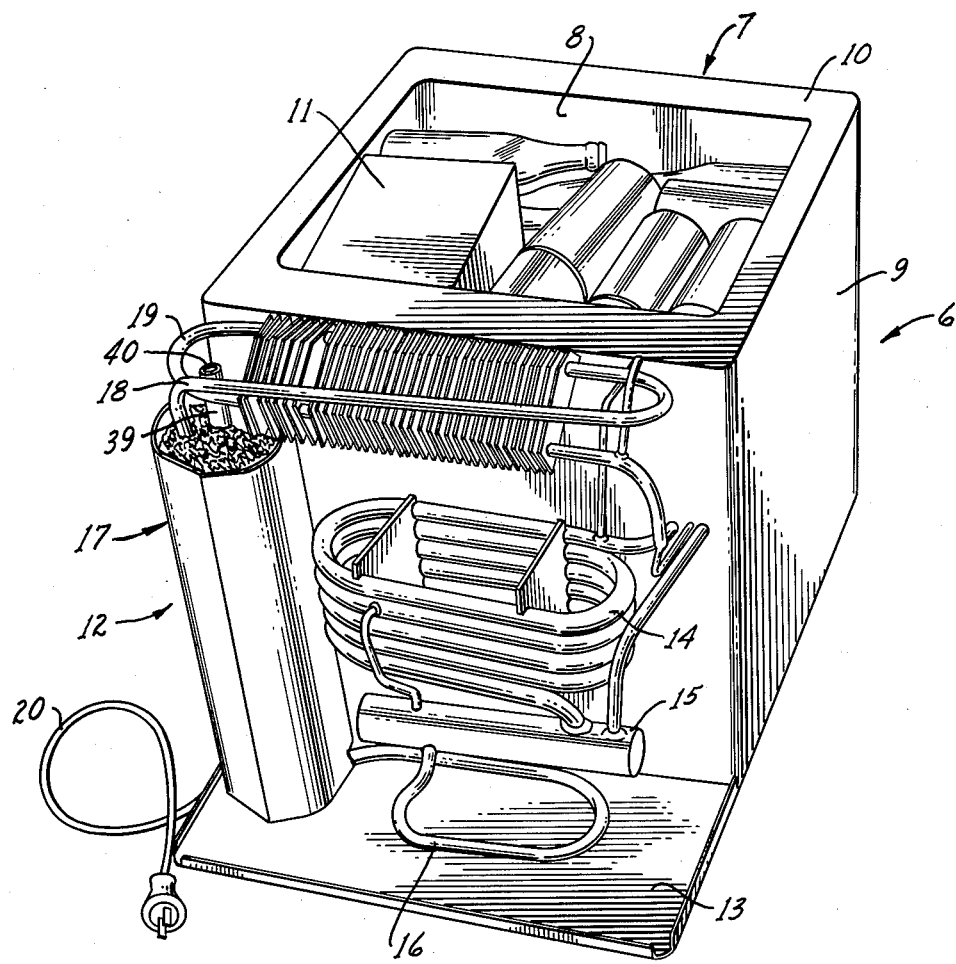
Figure 1 is a perspective view of a portable absorption refrigerator with portions omitted for clarity.

Referring first to FIGURE 1, a portable absorption refrigerator is indicated generally at 6. A cold box or storage chest is indicated at 7. In this instance the chest includes interior and exterior shells or casings 8 and 9 having suitable insulation therebetween (not shown) and a top plate 10. The cover of the refrigerator has been removed for purposes of clarity to illustrate a quantity of foodstuffs indicated generally at 11. An absorption refrigeration system indicated generally at 12 is mounted at the rear of the refrigerator on a bottom plate 13. When the refrigerator is assembled, a casing having an open grid on its top or side will enclose the refrigeration system.

The refrigeration system of FIGURE 1 consists essentially of a refrigerant absorber 14, an accumulator tank 15, a heat exchanger or auxiliary generator 16, a pump-generator unit 17, a rectifier 18, a condenser 19, and a suitable evaporating coil or coils, not shown, which cool the storage chest. The connecting cord of an electrical heating element which supplies heat to the system is indicated generally at 20. It will be understood that the electrical heating element may be replaced by a gas flame connected to any suitable gas supply, such as a small bottle of propane gas. In this latter event the gas bottle may be placed beneath the accumulator tank 15, or in any other convenient location, and connected by a gas line to a burner located within the pump-generator unit. It will be understood that within the scope of the invention any suitable source of heat may be utilized since the objects of the invention can be obtained independently of the type of heat employed.

Figure 2:
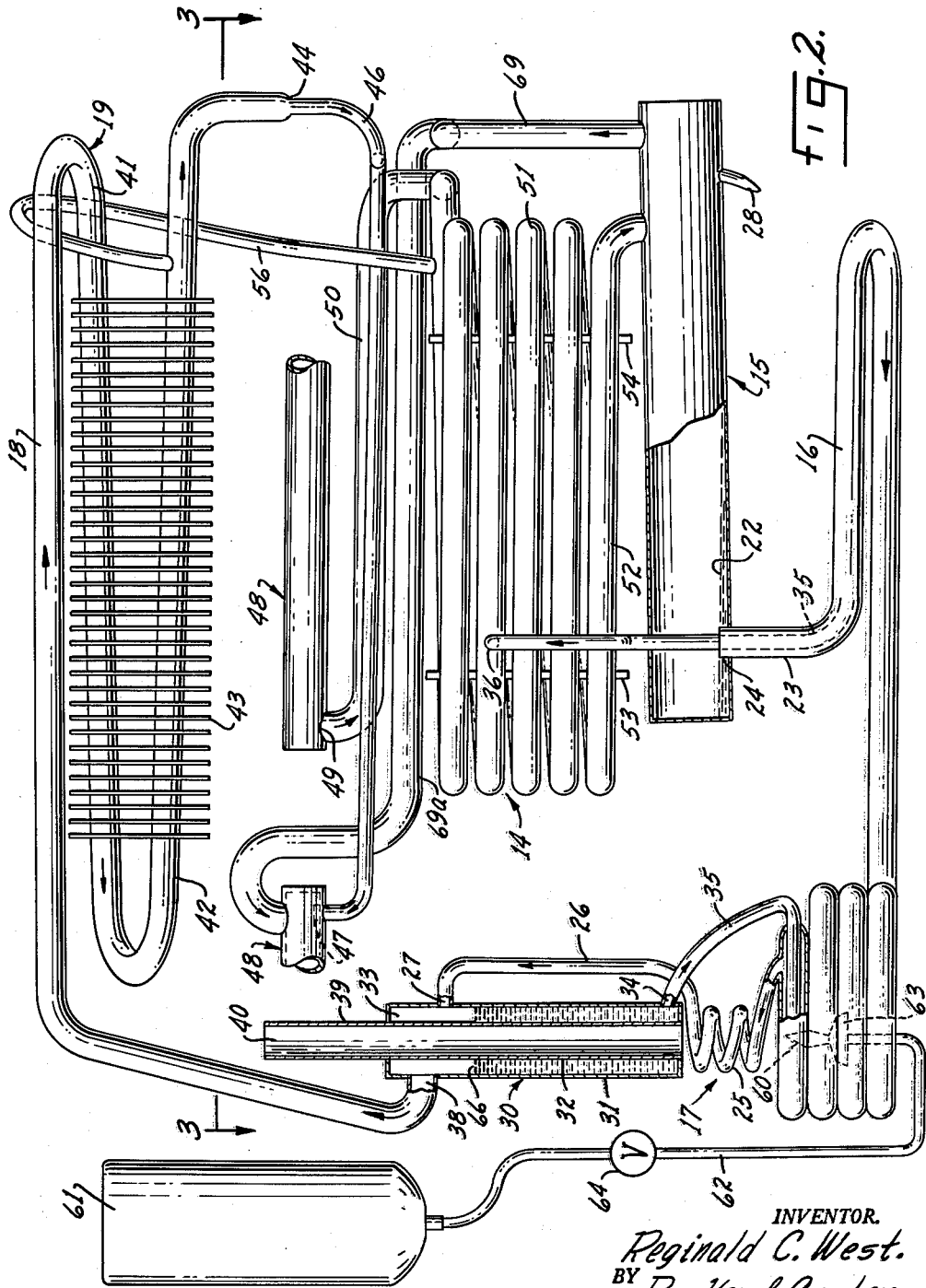
FIGURE 2 is an elevational view, partly schematic, of an absorption refrigeration system utilized in the refrigerator of FIGURE 1.
Figure 3:
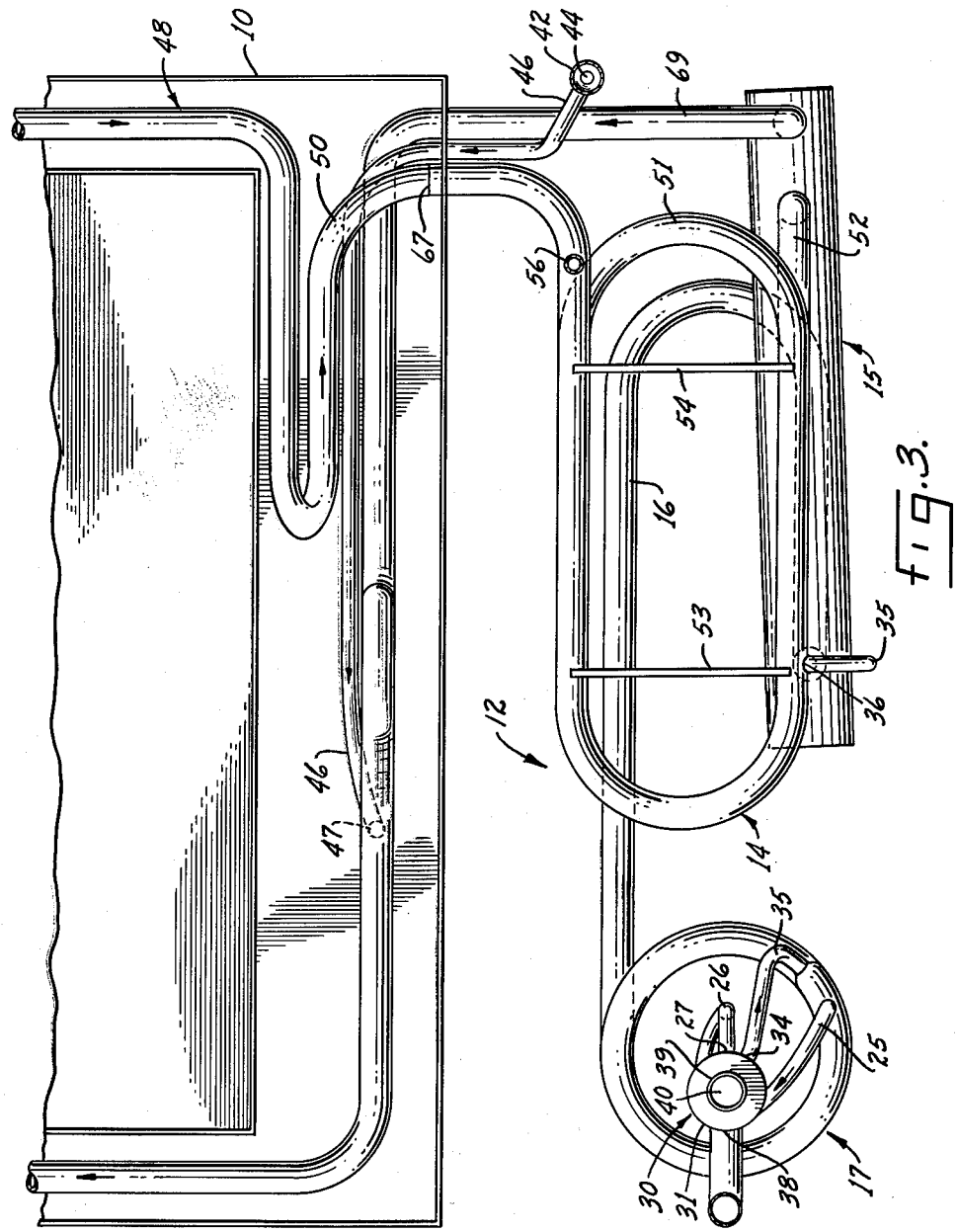
FIGURE 3 is a sectional view taken substantially along the line 3—3 of FIGURE 2.

The system is indicated in somewhat more detail in FIGURES 2 and 3. In FIGURE 2 the accumulator is shown as an elongated tank positioned at a slight downwardly inclined angle with respect to the horizontal so that a pool of strong liquor 22 forms at the lowest point in the tank. A filler tap is indicated generally at 28. Once the refrigerant, absorption liquid, and auxiliary agent has been admitted to the system, this tap is sealed.

Strong liquor from the accumulator 15 passes to the pump-generator unit 17 through heat exchanger 16. The heat exchanger consists essentially of a pair of concentric tubes. The outer tube 23 projects upwardly into the accumulator a slight distance above its bottom as at 24 for a purpose which will appear hereinafter. Outer tube 23 then extends to the pump-generator unit where it makes several turns and terminates in pump coil 25. The pump coil encircles a gas fed flame and then extends upwardly as at 26 and opens at 27 into the generator 30.

Generator 30 consists of a pair of concentric tubes 31, 32 which form an elongated annular chamber 33 therebetween. An outlet port 34 connects the inner tube 35 of the heat exchanger to the bottom of the generator. Tube 35 is located within the outer larger diameter tube 23 and discharges into the heat absorber 14 at 36.

A rectifier 18 opens into the upper end of annular chamber 33 at 38. The rectifier consists in this instance of a single pass of pipe lying on a slight upward angle which may be for example on the order of 5 to 15 degrees. Since the lower end of rectifier tube 18 and the generator will become quite hot during operation, this portion of the system should be encased in insulating material as shown in FIGURE 1. The inner wall 32 of the generator has been extended upwardly as at 39 so as to provide a flue 40 for the hot gases generated by the source of heat.

Rectifier 18 terminates in a condenser 19 which in this instance consists of a pair of downwardly inclined runs 41, 42 and a plurality of cooling fins 43 welded thereto. Although only two runs have been illustrated, a greater or lesser number may be employed, and likewise any suitable form of cooling fin may be utilized.

The condenser terminates in a constriction 44. A reservoir 46 connects the condenser to the inlet end of the evaporator 48. The discharge end of the reservoir extends upwardly as at 47 a short distance into the evaporator for a purpose which will be described later.

The evaporator in this instance is shown as a single coil extending about the periphery of the cold box. It will be understood, however, that within the scope of the invention one or a plurality of coils having single or multiple turns and positioned either within or without the cold box may be utilized. The outlet port 49 of the evaporator is connected by a return line 50 to the upper end of heat absorber 14.

Refrigerant absorber 14 consists essentially of a plurality of downwardly inclined turns 51 of tubing, the bottommost turn 52 of which opens into the accumulator near its upper end. A pair of spacer plates 53, 54 maintain the individual turns of the heat absorber spaced from one another to permit free circulation of ambient air thereabout.

Although a plurality of turns have been illustrated, it will be understood that variations in the shape or arrangement of the evaporator tube may be made within the scope of the invention. In one instance, for example, the exterior shell of the cabinet was utilized as an absorber surface. This was accomplished by forming the absorber as a single tube and positioning it about the inside of the exterior shell 9 of the cabinet. Although only a single wrap was utilized, the use of a plurality of turns is considered to be within the scope of the invention.

A vent 56 extends upwardly from the inlet end of the absorber and opens into the outlet end of the condenser coil 42 above the constriction 44.

In this instance the heat supply is indicated as a gas flame 60. The flame is fed from a gas container 61 connected by a gas line 62 to a burner 63. Any suitable valve 64 in the line may be used to turn the gas on and off. In the portable refrigerator of FIGURE 1, it has been found convenient to utilize a small bottle of propane gas which is initially under a pressure of approximately ½ p.s.i.g. When run continuously, a bottle of propane gas in a portable refrigerator of approximately 2 cubic feet will maintain a cold box temperature on the order of 32° F. or less for approximately 40 hours.

The use and operation of the invention is as follows:

Strong liquor 22 in the accumulator 15 passes via tube 23 through heat exchanger 16 to the pump coil 25. The liquor is a very strong (93–95%) solution of aqueous ammonia. As is well known, water at nearly any temperature can absorb many times its own volume of ammonia, and of course the lower the temperature the greater the capacity of the water to absorb ammonia. The temperature of the strong liquor is increased as it flows through the heat exchanger due to the counter current flow of weak liquor from the generator to the absorber, as will be explained in detail hereinafter. The liquor is further heated and partially vaporized in the pump coil, and a combination of vaporized ammonia, vaporized water and aqueous ammonia is forced upwardly through the elongated portion 26 of tube 25 and dumped into the upper end of the annular chamber 33 at 27. The liquid level 66 in the generator is higher than the point of entry 36 of the weak liquor to the absorber because heat from flame 60 has caused formation of vapor in the liquor. This has the effect of lightening the upwardly extending column in tap 26 as compared to the liquid column in the accumulator and thus liquid passes into the generator.

From point 27, the ammonia vapors pass upwardly through rectifier 18 to the condenser section. Any water vapor which passed upwardly to the rectifier with the ammonia is condensed and drops downwardly to the bottom of the generator. Condensed water from the rectifier and water pumped into chamber 33 from tube 23 passes as weak liquor through the tube 35 in the heat exchanger 16 in counter-current flow to the strong liquor in the outer tube 23. The weak liquor is finally dumped into the heat absorber at 36.

From the rectifier the vaporized ammonia passes into the condensers 41, 42, 43 where it may be partially or entirely reliquified. The temperature drop between the inlet to the rectifier and the outlet of the condenser may be on the order of approximately 100 degrees. If the inlet condenser temperature is on the order of 200 to 230 degrees Fahrenheit, the outlet condenser temperature may be on the order of 90 to 95 degrees Fahrenheit, for example.

Line 46 acts as a reservoir for the ammonia which, by the time it passes constriction 44, is substantially entirely liquid. Since the constriction 44 is at a higher level than the outlet end of the reservoir, the refrigerant flows therethrough and passes into the evaporator as indicated by the arrows. The outlet end of the reservoir projects upwardly into the evaporator a short distance as at 47 so as to form a small reservoir of liquid ammonia within the evaporator.

In the foregoing description, it has been assumed that the refrigerant is substantially pure ammonia by the time it reaches the evaporator. It should be understood however that this is a steady flow process and in all probability the composition of the fluids at many points in the system will be a combination of water and ammonia in vapor and liquid phases and in varying proportions. Hydrogen will of course also be present in varying amounts at many points in the system.

The refrigerant passes through the evaporator coil 48 extracting heat from the contents of the cold storage box. As heat is absorbed, the refrigerant is further vaporized. The vaporized refrigerant passes via return line 50 into the upper end of the refrigerant absorber at joint 67. In the refrigerant absorber the ammonia is continually absorbed into the water contained therein until a strong liquor 22 is formed in the bottom of the accumulator. Since heat is evolved when the ammonia goes into solution in the absorber, the absorber coils are exposed to ambient air so that the heat can be removed from the system. From the accumulator, the strong liquor again passes through the heat exchanger 16 and is recirculated through the system.

It should also be understood that the quantity of water in the heat absorber or in the system at any point at any time is very small. A cross-section through an absorber coil would indicate for example that the water occupies only a very small cross-sectional area of the coil.

In order to maintain proper pressures in the system and induce rapid evaporation of the ammonia in the evaporator coil, an auxiliary agent is added to the system. In one practical installation, a hydrogen atmosphere of approximately 185 pounds per square inch gauge was maintained within the system. A hydrogen line 69 tapped into the upper end of the accumulator drains off hydrogen from the accumulator and passes it into the evaporator above the ammonia inlet 47. There is thus a good supply of hydrogen in the evaporator at all times which aids in the vaporization of the ammonia. In effect, the hydrogen reduces the partial pressure of the ammonia in the evaporator to a point where the ammonia can absorb heat at the temperatures which exist in the cold box.

One of the outstanding features of the invention is the fact that the entire unit may be made so light in weight that children or women can easily pick up and carry a portable unit on the order of 2 cubic feet capacity in an unloaded condition. This is due to the fact that the entire system is composed of aluminum.

Ammonia in a water solution is very corrosive with respect to aluminum. In order to prevent the ammonia from attacking the aluminum, a small quantity of glycerine is added to the ammonia-water solution. The glycerine in this solution has the unexpected ability to act as an aluminum corrosion inhibitor. Tests have indicated that the life of this system is substantially equal to that of conventional steel or cast iron systems. In one instance, a charge of 18 ounces of aqueous ammonia having a specific gravity of .8968 at 29.75 Baumé degrees which gave a solution of 29.89% $NH_3$ was mixed with an additive of 1.25 ccs. of glycerine. The glycerine was introduced after the solution was made. After the solution was admitted to the system through the tap 28 in reservoir 15, 185 pounds per square inch gauge of hydrogen gas was admitted under a vacuum of 28 inches of mercury. With suitable insulation such as foamed polystyrene or fiber glass between the cold storage box shell and the exterior of the container, it is possible to maintain a cold storage box or cabinet of approximately 2 cubic feet capacity at approximately 31 to 33 degrees Fahrenheit in ambient temperatures.

The refrigerant charge described above has given excellent results. Tests have shown however that best results may be obtained only if the percentage of glycerine to aqueous ammonia is rather small, for example, on the order of about 1% to 3% by weight of glycerine to aqueous ammonia. Somewhat larger percentages of glycerine may be used, but such larger percentages may cause a viscous solution to form when the system has been inactive for a time. Such a viscous solution may make starting difficult or even impossible. Even within the aforementioned range, difficulties may be encountered, and experience has shown that a solution of about 1% by weight of glycerine to aqueous ammonia gives very good results. The desirable effect of the glycerine may not be achieved if less than 1% is used.

Although a gas supply has been indicated in FIGURE 2, it should be understood that any suitable heat source may be utilized. It may be possible, for example, to completely replace the propane gas cylinder 61 with an electric heating element such as a cartridge heater which could be inserted within the hollow cylindrical chamber formed by the inner tube of the generator. A great advantage of the propane gas supply is that the refrigerator may be operated in places in which a source of power supply is not available, such as in wilderness areas.

When operating with an electric heating element, such as a cartridge heater, it is highly desirable that a baffle be inserted in the open center or flue of the generator to keep the heat down at the lower end thereof. One convenient form of baffle may consist of a plurality of circular disks spaced along a rod, each disk being of a size sufficient to be received within the flue and having a chordal section cut away to provide a path for the hot gases generated within the flue. By the use of optional accessories, the heating element can be operated from a 6, 12 or 110 volt power supply.

It should also be understood that although the parts in FIGURE 2 have been shown exposed to ambient atmosphere, it is expedient to enclose at least the pump-generator unit 17 and the three parallel lines 69a, 50 and 46 in insulating material.

Although several embodiments of the invention have been illustrated and described, it will be understood that the above showing is illustrative only, and accordingly the scope of the invention should only be limited by the scope of the following appended claims.

I claim:

1. An absorption refrigeration system refrigerant charge, said refrigerant charge comprising water, ammonia, and a corrosion inhibitor, said corrosion inhibitor being a small but effective quantity of glycerin, the upper limit of the glycerin being a quantity beyond which the refrigerant charge tends to become viscous, particularly after a period of inactivity.

2. An absorption refrigeration system refrigerant charge, said refrigerant charge comprising water, ammonia, and a corrosion inhibitor, said corrosion inhibitor being glycerin, said glycerin being present in an amount of from about 1% to about 3% by weight of the aqueous ammonia.

3. An absorption refrigeration system refrigerant charge, said refrigerant charge comprising water, ammonia, and a corrosion inhibitor, said corrosion inhibitor being glycerin, the glycerin being present in an amount on the order of about 1% by weight of the aqueous ammonia.

4. An aluminum absorption refrigeration system refrigerant charge, said refrigerant charge comprising water, ammonia, and a corrosion inhibitor, said corrosion inhibitor being glycerin, said glycerin being present in an amount of from about 1% to about 3% by weight of the aqueous ammonia.

5. An aluminum absorption refrigeration system refrigerant charge, said refrigerant charge comprising water, ammonia, and a corrosion inhibitor, said corrosion inhibitor being glycerin, the glycerin being present in an amount on the order of about 1% by weight of the aqueous ammonia.

6. An aluminum system absorption refrigerating process comprising liquefying and evaporating an aqueous ammonia solution containing as a corrosion inhibitor a small but effective quantity of glycerin.

7. An absorption refrigerating process comprising liquefying and evaporating a refrigerant charge comprising water, ammonia, and a corrosion inhibitor, said corrosion inhibitor being glycerin, said glycerin being present in an amount from about 1% to about 3% by weight of the aqueous ammonia.

8. An absorption refrigerating process comprising liquefying and evaporating a refrigerant charge comprising water, ammonia, and a corrosion inhibitor, said corrosion inhibitor being glycerin, said glycerin being present in an amount on the order of about 1% by weight of the aqueous ammonia.

9. An aluminum absorption refrigeration system process, said process including the steps of liquefying and evaporating a refrigerant charge comprising water, ammonia, and a corrosion inhibitor, said corrosion inhibitor being glycerin, said glycerin being present in an amount from about 1% to about 3% by weight of the aqueous ammonia.

10. An aluminum absorption refrigeration system process, said process including the steps of liquefying and evaporating a refrigerant charge comprising water, ammonia, and a corrosion inhibitor, said corrosion inhibitor being glycerin, said glycerin being present in an amount on the order of about 1% by weight of the aqueous ammonia.

11. An absorption refrigeration system, said system including structure for liquefying and evaporating a refrigerant charge, said refrigerant charge including water, ammonia, and a small but effective quantity of glycerin, refrigerant charge contacting portions of said system being composed of aluminum.

12. An absorption refrigeration system, said system including structure for liquefying and evaporating a refrigerant charge, said refrigerant charge including water, ammonia, and an aluminum corrosion inhibitor, said inhibitor being glycerin in an amount of from about 1% to about 3% by weight of the aqueous ammonia, refrigerant charge contacting portions of said system being composed of aluminum.

13. The system of claim 12 further characterized by and including a pressure stabilizing auxiliary agent such as hydrogen.

14. An absorption refrigeration system, said system including structure for liquefying and evaporating a refrigerant charge, said refrigerant charge including water, ammonia, and an aluminum corrosion inhibitor, said inhibitor being glycerin, said glycerin comprising about 1% by weight of the aqueous ammonia, refrigerant charge contacting portions of said system being composed of aluminum.

15. The system of claim 14 further characterized by and including a pressure stabilizing auxiliary agent such as hydrogen.

16. A portable, light weight, absorption refrigeration system, said system including, in combination, a generator, condenser, evaporator, a refrigerant absorber, a refrigerant charge, and suitable connections for providing a flow path for the refrigerant charge through the system, all of said refrigerant charge contacting components being composed of aluminum, said refrigerant charge containing, as an aluminum corrosion inhibitor, glycerin, said glycerin being present in an amount of from about 1% to about 3% by weight of the aqueous ammonia.

References Cited in the file of this patent

UNITED STATES PATENTS

| | | |
|---|---|---|
| 236,843 | Rossi et al. | Jan. 18, 1881 |
| 1,855,659 | Weight | Apr. 26, 1932 |
| 1,960,040 | Widell | May 22, 1934 |
| 2,271,574 | Tucker | Feb. 3, 1942 |
| 2,482,517 | Schiermeier | Sept. 20, 1949 |